US000001182H

United States Statutory Invention Registration [19]

[11] Reg. Number: H1182

Spry

[43] Published: May 4, 1993

[54] DIELECTRIC OPTICAL SWITCH

[75] Inventor: Robert J. Spry, Tipp City, Ohio

[73] Assignee: The United States of America as represented by the Secretary of the Air Force, Washington, D.C.

[21] Appl. No.: 855,203

[22] Filed: Apr. 8, 1986

[51] Int. Cl.[5] ..... G02B 5/20

[52] U.S. Cl. ..... 359/320; 359/359; 359/586; 359/588; 359/885

[58] Field of Search ..... 350/354, 353, 311; 332/7.51

[56] References Cited

U.S. PATENT DOCUMENTS

| | | | |
|---|---|---|---|
| 3,384,324 | 5/1968 | O'Sullivan. Jr. | 350/354 X |
| 3,512,869 | 5/1970 | Plumat et al. | 350/354 |
| 3,743,964 | 7/1973 | Drexhage et al. | 331/94.5 |
| 3,953,110 | 4/1976 | Chahroudi | 350/266 |
| 3,992,628 | 11/1976 | Karney | 250/338 |
| 4,099,840 | 7/1978 | van der Wal et al. | 350/166 |
| 4,260,225 | 4/1981 | Walles | 350/353 |
| 4,261,331 | 4/1981 | Stephens | 350/353 X |
| 4,307,942 | 12/1981 | Chahroudi | 350/353 |

OTHER PUBLICATIONS

"Accurate Determination of the Ordinary-Ray Refractive Index in $GaTiO_3$" by W. N. Lawless and R. C. DeVries, J App Phys 35:9,2638-9 (Sep. 1964).

"Synthesis, Characterization and Optical Properties of Barium Titanate Films Sputtered Under Various Conditions", by J. C. Olson et al Rept AFWAL-TR-81-4049 (Jun. 1981).

"X-Ray Temperature Study of Crystallographic Characteristics of Barium Titanate", by L. A. Shebanov, Phys Stat sol A 65, 321 (1981).

"Theory of Rejection Filters with Ultranarrow Bandwidths", by P. Baumeister, J Opt Soc Am 71:5, 604-6 (1981).

"Refractive Index of $BaTiO_3$ Films", by M. Wohlecke et al, J App Phys 48:4, 1748-50 (Apr. 1977).

"Radio Frequency Sputtered Tetragonal Barium Titanate Films on Silicon", by J. K. G. Panitz et al, J Vac Sci Tech 16:2, 315-18 (Mar.-Apr. 1979).

"Validity of Vegard's Law in Ferroelectric Solid Solutions Based on $BaTiO_3$ and $SrTiO_3$", by L. A. Shebanov et al, Sov. Phys Sol St 23:3 373-6 (Mar. 1981).

*Primary Examiner*—Bernarr E. Gregory

*Attorney, Agent, or Firm*—Bobby D. Scearce; Donald J. Singer

[57] ABSTRACT

A novel optical filter structure for selectively blocking radiation of predetermined wavelength is described which comprises a plurality of alternate first and second layers deposited on a substantially transparent substrate, the first layers comprising a transparent nontransitioning material of first refractive index, the second layers comprising a material characterized by a transition from ferroelectric phase having second refractive index to nonferroelectric phase having third refractive index different from the first and second indices upon being heated to a characteristic transition temperature, each of the first and second layers having a thickness substantially equal to one-fourth times the ratio of the predetermined wavelength to the respective index of refraction.

6 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DIELECTRIC OPTICAL SWITCH

RIGHTS OF THE GOVERNMENT

The invention described herein may be manufactured and used by or for the Government of the United States for all governmental purposes without the payment of any royalty.

BACKGROUND OF THE INVENTION

The present invention relates generally to laser hardened materials and structures, and more particularly to a novel optical filter structure for selectively blocking laser radiation of predetermined wavelength while passing radiation of other wavelengths.

Optical switching devices comprising transition or switching materials which are transparent in one state but which transform to an opaque metallic state when heated to a characteristic transition temperature are well developed for applications such as optical filters, modulators, laser output couplers, and the like. These devices are generally characterized by a transition from substantial transparency below the characteristic transition temperature to substantial opacity above that temperature.

The present invention comprises an optical reflection filter which is substantially totally transmissive at substantially all wavelengths below a characteristic temperature, but which becomes reflective upon being heated to a ferroelectric phase transition temperature upon absorption of invasive radiation.

The invention comprises an optical filter structure including alternate layers of ferroelectric material and another suitable material which have substantially equal refractive indices in the unswitched state below the characteristic temperature, and which have in the switched state an optical thickness substantially equal to one-fourth the wavelength of the invasive radiation to be block by the filter. When the filter of the invention is heated to the characteristic temperature, the refractive index of the ferroelectric layers changes to a different value which produces in the filter classic quarter wave interference. A filter according to the invention may therefore be configured to allow an optical system to continuously receive an operational signal and simultaneously block invasive, potentially destructive, radiation.

It is therefore a principal object of the present invention to provide an improved optical filter.

It is a further object of the present invention to provide an optical filter for selectively blocking radiation of preselected wavelength while passing radiation of other wavelengths.

It is yet a further object of the invention to provide an optical filter which is transparent below a characteristic temperature but which switches to a reflective state upon being heated to the characteristic temperature.

It is yet another object to provide an optical filter having fast response time.

It is yet a further object of the invention to provide an optical filter having low absorption losses prior to switching.

It is yet another object of the invention to provide an optical filter which is independent of the wavelength of the impinging radiation prior to switching.

These and other distinguishing features and objects of the present invention will become apparent as the detailed description of certain representative embodiments thereof proceeds.

SUMMARY OF THE INVENTION

In accordance with the foregoing principles and objects of the present invention, a novel optical filter structure for selectively blocking radiation of predetermined wavelength is described which comprises a plurality of alternate first and second layers deposited on a substantially transparent substrate, the first layers comprising material of first refractive index, the second layers comprising a material characterized by a transition from ferroelectric phase having second refractive index to nonferroelectric phase having third refractive index different from the first and second indices upon being heated to a characteristic transition temperature, each of the first and second layers having a thickness substantially equal to one-fourth times the ratio of the predetermined wavelength to the respective index of refraction.

DESCRIPTION OF THE DRAWINGS

The present invention will be more clearly understood from the following detailed description of certain representative embodiments thereof read in conjunction with the accompanying drawings wherein.

DETAILED DESCRIPTION

Figure 1:
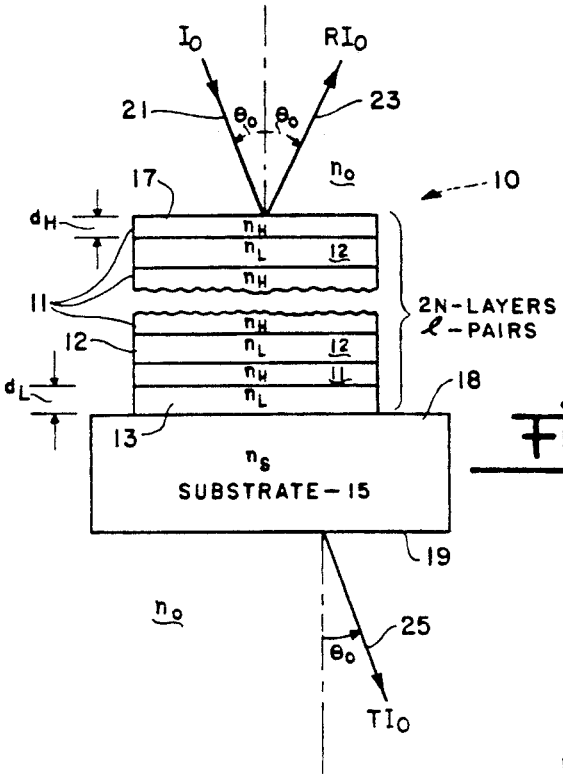
FIG. 1 is a fragmentary sectional view of a layered structure of the present invention.

Referring now to FIG. 1 of the drawings, shown therein is a schematic sectional view of a layered structure representative of the optical filter of the invention. As shown in FIG. 1, a filter 10 of the invention comprises a predetermined plurality N of film layers 11 of ferroelectric material and alternated with N film layers 12 of other suitable transparent material, the structure thereby comprising a predetermined number 2N of layers in the form of l layer pairs. The ferroelectric layers 11 comprise a material characterized by a transition from one optically transparent phase having a characteristic index of refraction to a different optically transparent phase having a different index of refraction upon being heated to a characteristic ferroelectric-to-nonferroelectric phase transition temperature $T_C$. Layers 12 are nontransitioning in the operational temperature range of filter 10. The ferroelectric material layers 11 and nontransitioning layers 12 are selected to have substantially equal refractive indices in the unswitched (below $T_C$) state of layers 11 and whose optical thicknesses are equal to $\lambda_o/4$ in the switched state of layers 11, where $\lambda_o$ is the wavelength of radiation sought to be blocked by filter 10. Therefore, when invasive radiation of wavelength $\lambda_0$ impinges on the stack of layers 11,12, the stack is heated to $T_C$, the refractive index of layers 11 changes to a different value above $T_C$, and a quarter wave stack interference filter results.

Filter 10 is preferably constructed of ferroelectric layers 11 of a material having a characteristic $T_C$ above room temperature and a significant change of refractive index at the transition temperature. Preferably, the characteristic $T_C$ will not be significantly above room temperature. Layers 11 may therefore comprise substantially any transparent ferroelectric material undergoing the desired change of refractive index, such as barium titanate, strontium titanate and mixed alloys thereof; barium niobate, strontium niobate, and mixed alloys thereof; and barium sodium niobate, potassium niobate, bismuth germanate, and strontium sodium niobate.

Layers 11,12 may be deposited by any process known in the art for such purposes, although vacuum techniques, and particularly radio frequency sputtering may be preferable as being the process most reproducible. The refractive index of a sputtered layer may not be the same as that of the corresponding bulk crystalline material, but may dependent upon the degree of crystallinity, substrate temperature during deposition, and oxygen content of the sputtering atmosphere. thus for a given wavelength the refractive indices of layers 11,12 may be controllable over a fairly wide range which allows close matching of refractive indices of layers 11,12 below the characteristic $T_C$ of layers 11.

Filter 10 may therefore be fabricated by first (preferably) depositing a nontransitioning layer 13 (substantially identical to a layer 12) on a substrate 15 comprising a transparent insulator or semiconductor material. Following deposition of layer 13, alternate layers 11,12 are deposited to respective preselected thicknesses to produce the quarter wave stack shown in FIG. 1 having l layer pairs. The layer thickness $d_H$ for layers 11 are chosen so that, $$d_H=\lambda_o/4n_H \quad (1)$$

and $d_L$ for layers 12 is, $$d_L=\lambda_o/4n_L \quad (2)$$

where $\lambda_o$ is the wavelength to be blocked, $n_H$ is the refractive index of the ferroelectric material above the transition temperature, and $n_L$ is the refractive index of the nontransitioning material (layers 12) at substantially all operational temperatures for the filter. Anti-reflective coatings may be applied on the last applied layer at surface 17 or to either surface 18,19 of substrate 15 (e.g., at the layer 13-substrate 15 interface prior to deposition) to reduce reflection losses. Further, an odd number of layers 11,12 may be applied without significant impairment of filter 10 performance if such is desired for convenience of fabrication or otherwise.

The stepwise change in refractive index of filter 10 may be illustrated by considering an ordinary light ray 21 incident of intensity $I_o$ at an angle $\theta_o$ at surface 17 of filter 10, a portion thereof being reflected as illustrated at $\theta_o$ as reflected ray 23 of intensity $RI_o$. Transmitted (refracted) ray 25 of intensity $TI_o$ is emergent from substrate 15 at angle $\theta_o$ (assuming the index of refraction $n_o$ of the medium, e.g., air, near surface 17 is the same as that near surface 19), but offset from the direction of incidence of ray 21 by a distance characteristic of the refractive index of filter 10. The temperature dependence of the operation of filter 10 for an extraordinary ray is more pronounced than for the ordinary ray, and can be enhanced by optical illumination to lower the transition temperature.

Nontransitioning layers 12 of filter 10 may be any material which is substantially transparent over the wavelength range of interest and which does not undergo a phase change so as to alter its index of refraction in the operational range of filter 10 (e.g., from about −20° C. to about 120° C.) and which preferably has lattice constants like those of the ferroelectric layers 11 (e.g., $BaTiO_3$). For example, a 50/50 composition of strontium titanate and barium titanate has a characteristic phase change below −40° C. and a lattice constant substantially equal to that of substantially pure barium titanate. Suitable materials for layers 12 may be selected as would occur to one with skill in the field of the invention.

Figure 2:
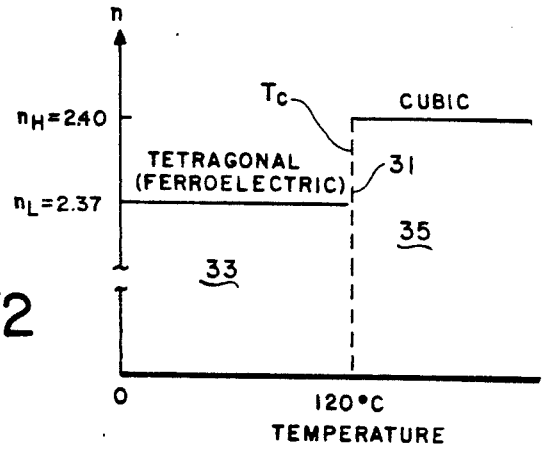
FIG. 2 is a plot of refractive index versus temperature for barium titanate.

Referring now to FIG. 2, shown therein is a plot of index of refraction versus temperature for barium titanate ($BaTiO_3$), a desirable material for transition layers 11 of filter 10. An abrupt and significant change at 31 in refractive index from 2.37 to 2.40 at about 120° C. is evident. The illustrated change in refractive index corresponds to a change in crystal structure of the barium titanate from tetragonal (a=3.99, c=4.035 angstroms at 0° C.) in region 33 below 120° C. to cubic (a=4.01 angstroms at 150° C.) in region 35. The tetragonal structure for $BaTiO_3$ is ferroelectric, while the cubic structure is nonferroelectric. The tetragonal structure us birefringent characteristic of the symmetry of the crystal.

Figure 3:
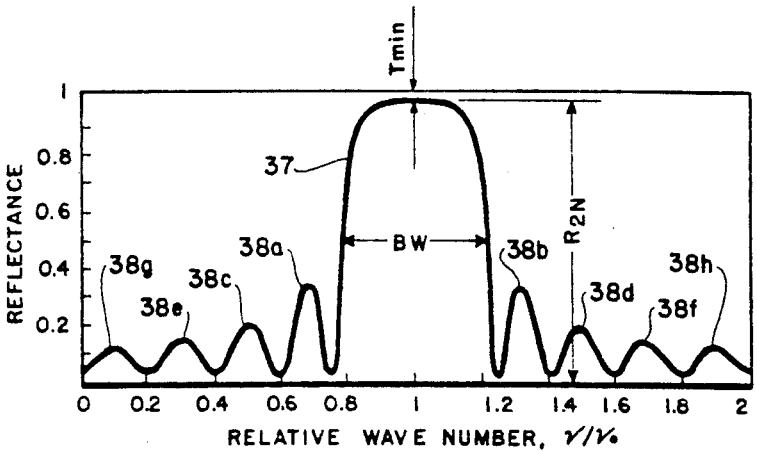
FIG. 3 is a plot of reflectance versus relative wave number illustrating a representative reflectance spectrum for a filter according to the invention.

Referring now to FIG. 3, shown therein is an illustration of the spectral performance of a typical ferroelectric reflection band filter of the present invention. Plotted in FIG. 3 is the reflectance R of the filter versus relative wave number $\nu/\nu_o$ where $\nu_o$ is the frequency of the radiation the filter is designed to reflect. The maximum reflection $R_{2N}$ and minimum transmission $T_{min}$ are related as, $$T_{min}+R_{2N}=1 \quad (3)$$

The width of the central reflection band 37, defining the range of relative wave numbers reflected by the filter is defined as BW at half maximum of reflection band 37. The minor higher order oscillations 38*a–h* shown in FIG. 3 on either side of central reflection band 37 are not of significance to the teachings hereof.

Consider an example filter of the invention as illustrated in FIG. 1 is required to reflect invasive radiation of wavelength at 0.5 microns. Using the reflective indices given in FIG. 2 the layer thickness $d_H$ and $d_L$ from Equations (1) and (2) are, respectively, 0.05208 microns and 0.05274 microns. The minimum transmission of the filter at the central reflection band 37 centered on the central frequency $\nu_o$ (of the invasive radiation) is given by:

$$T_{min}=4/(n_H/n_L)^l \quad (4)$$

Figure 4:
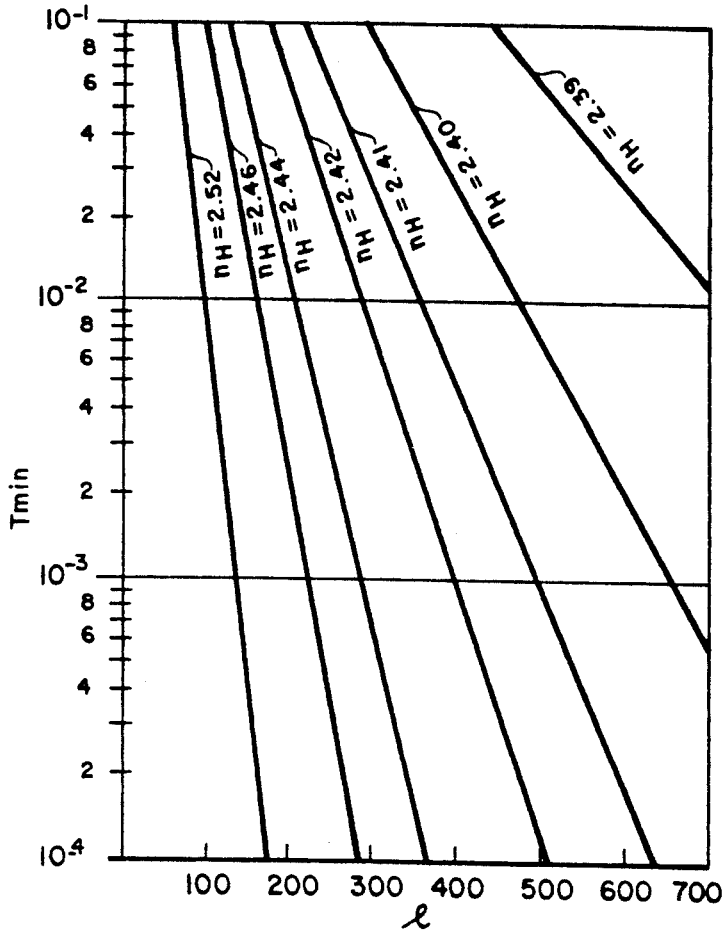
FIG. 4 is a plot of minimum transmission versus number of layer pairs of tetragonal barium titanate in the structure of the invention.
Figure 5:
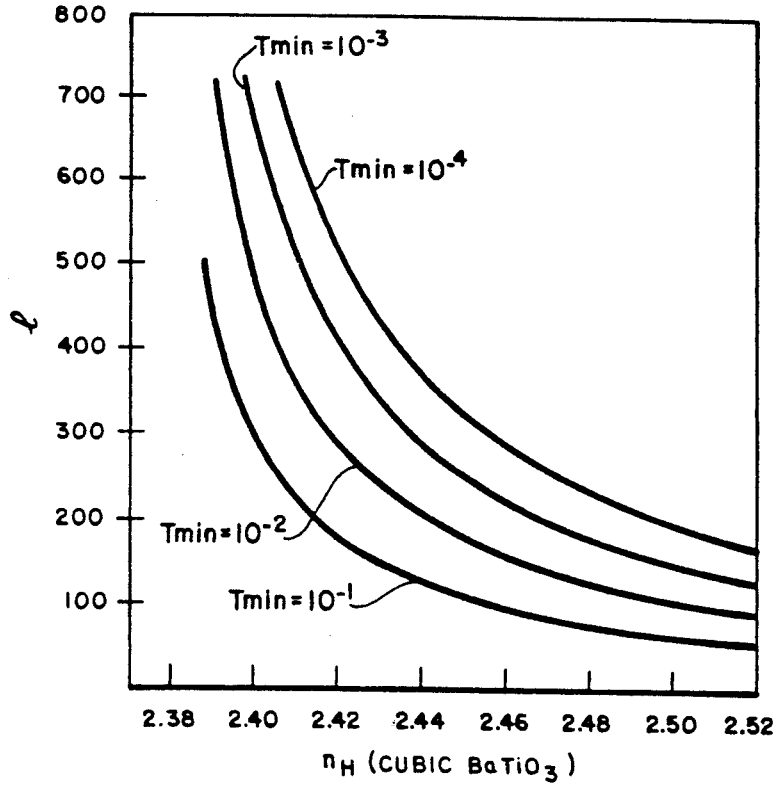
FIG. 5 is a plot of layer pairs of the structure of the invention versus nonferroelectric refractive index in tetragonal barium titanate.

The numerical results of Equation (4) are given in two different formats in FIGS. 4 and 5. In FIG. 4, $T_{min}$ of the filter (from Equation (4)) versus number of pairs l is presented for various values of $n_H$ and an $n_L$ of 2.37 (characteristic of tetragonal $BaTiO_3$). In FIG. 5, number of layer pairs l versus $n_H$ is plotted for various desired values of $T_{min}$. In the present example, i.e., and $n_H$ equals 2.40, a value of $T_{min}$ of $10^{-2}$ may be obtained using 475 layer pairs and of $10^{-3}$ may be obtained using 655 layer pairs. It is noted that certain manufacturing advantages are manifest for $n_L$ appreciably different from $n_H$.

The width at half maximum BW (see FIG. 3) of the central reflection band 37 is given by:

$$BW = \frac{4}{\pi} \frac{(n_H - n_L)}{n_H + n_L} \tag{5}$$

Figure 6:
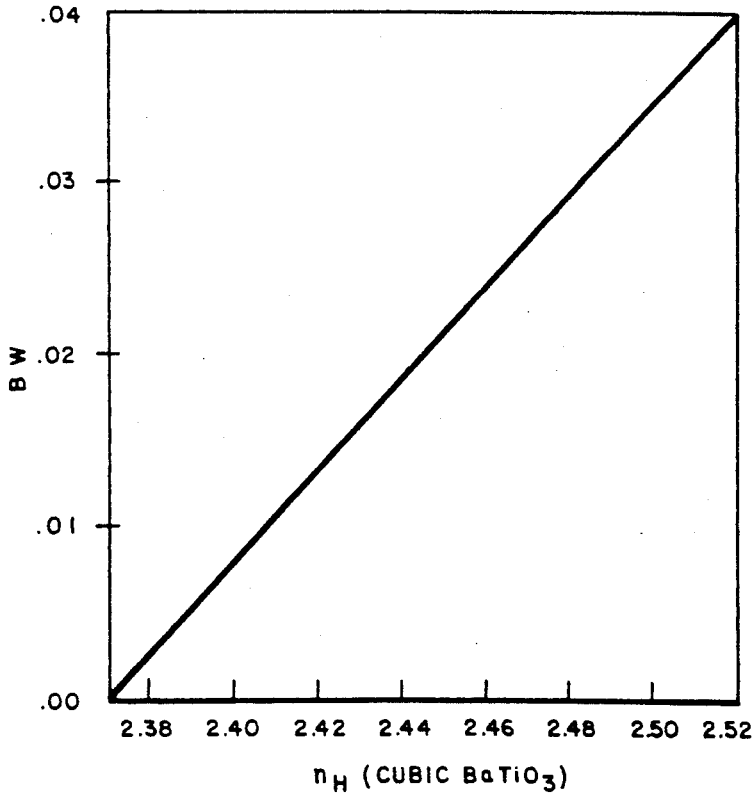
FIG. 6 is a plot of reflection band width for a representative structure of the invention versus nonferroelectric refractive index for tetragonal barium titanate.

FIG. 6 plots BW versus $n_H$ (for cubic $BaTiO_3$). In the present example ($n_H$=2.40), BW is seen to be less than 0.01. From FIG. 4 it is seen that a large value for $n_H$ is desirable in order to minimize the required number of layer pairs for a selected value of $T_{min}$. As seen from FIG. 6, no practical limitations are necessarily imposed on BW by achieving a larger value of $n_H$.

Figure 7:
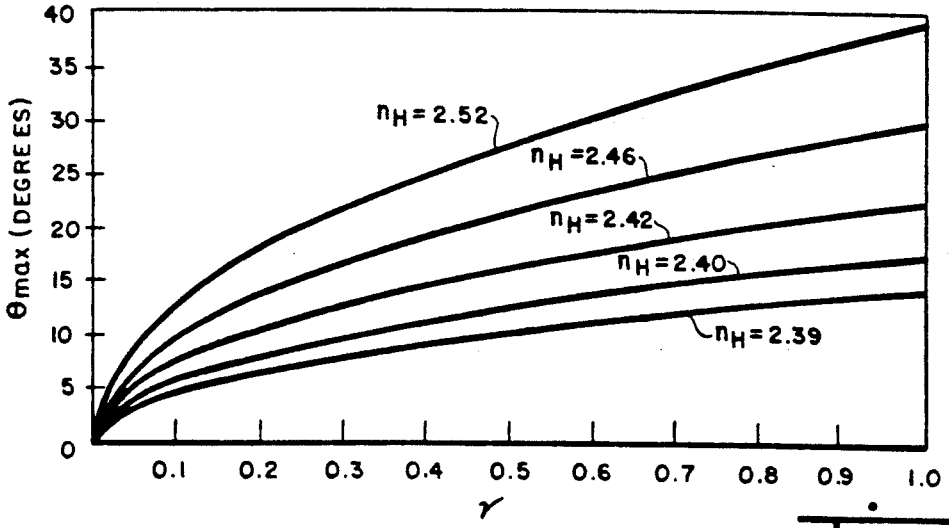
FIG. 7 is a plot of maximum laser angle versus maximum tolerable fractional spectral shift for the invention.

Referring again to FIG. 1, the effects of angle of incidence of invasive radiation on the shift of the central reflection band can be calculated as follows. The maximum angle of incidence $\theta_{max}$ at which the filter will operate as intended is given by, $$\theta_{max} = 2\sqrt{\frac{\gamma}{2\pi}(n_H - n_L)(n_H + n_L)} \tag{6}$$

where $\gamma$ is the maximum tolerable fractional shift of the central reflection band. In the example discussed above ($n_H$=2.40, $n_L$=2.37), $\theta_{max}$ is 13° for a practical value of a $\gamma$ equal to 0.5. The total field of view 2 $\theta_{max}$ is therefore 26° for the example. Achieving a large value for $n_H$ in order to reduce l results in an increase $\theta_{max}$. FIG. 7 presents $\theta_{max}$ versus $\gamma$ for various values of $n_H$ according to Equation (6).

The present invention, as hereinabove described, therefore provides an optical reflection band filter for selectively reflecting a preselected wavelength upon being heated to a characteristic temperature, while remaining substantially transparent to all wavelengths below the characteristic temperature. The response of the filter is wavelength independent prior to switching from the transparent state to the reflecting state. The filter may be constructed to be effective at angles of incidence of invasive radiation up to about 15°. The filter blocks radiation centered about a preselected band centered on a preselected invasive wavelength and, due to the switching mechanism characterizing its operation, exhibits minimum absorption losses in the unswitched (transparent) state.

It is understood that certain modifications to the invention as described may be made, as would occur to one with skill in the field of the invention, within the scope of the appended claims. Therefore, all embodiments contemplated hereunder and encompassed within the scope of the claims have not been shown in complete detail. Other embodiments may be developed without departing from the spirit of the invention or from the scope of the appended claims.

I claim:

1. An optical filter structure for selectively block radiation of preselected wavelength, comprising:

(a) a substantially transparent substrate;

(b) a plurality of alternate substantially identical first layers and substantially identical second layers on said substrate, wherein said first layers comprise a transparent material of preselected first refractive index, and said second layers comprise a material having a substantially transparent ferroelectric phase of second refractive index below a characteristic transition temperature and a nonferroelectric phase of third refractive index different from said first refractive index and from said second refractive index above said characteristic transition temperature, said first layers having said first refractive index above and below said characteristic transition temperature; and (c) wherein the thickness of each of said first layers is equal to one-fourth times the ratio of said preselected wavelength to said first refractive index and the thickness of each of said second layers is equal to one-fourth times the ratio of said preselected wavelength to said third refractive index.

2. The filter structure as recited in claim 1 wherein said second layers comprise a ferroelectric material having a characteristic transition temperature near room temperature.

3. The filter structure as recited in claim 1 wherein said second layers comprise a ferroelectric material having a characteristic transition temperature higher than room temperature.

4. The filter structure as recited in claim 3 wherein said second layers comprise a material selected from the group consisting of barium titanate, strontium titanate, barium niobate, strontium niobate, barium sodium niobate, potassium niobate, bismuth germanate, and strontium sodium niobate.

5. The filter structure as recited in claim 1 wherein said first refractive index equals said second refractive index.

6. The filter structure as recited in claim 1 further comprising an antireflection coating on at least one of a surface of the layer most remote from said substrate and a surface of said substrate.

* * * * *